United States Patent [19]

Cooper et al.

[11] Patent Number: 5,211,832
[45] Date of Patent: May 18, 1993

[54] PROCESS FOR PRODUCING ELECTRICALLY IMPERVIOUS ANODIZED FILMS ON VALVE METALS AND PRODUCT THEREOF

[75] Inventors: Mathew Cooper, Fombell; Harry Rosenberg, Pittsburgh, both of Pa.

[73] Assignee: The Alta Group, Fombell, Pa.

[21] Appl. No.: 872,061

[22] Filed: Apr. 22, 1992

[51] Int. Cl.⁵ .................. C25D 11/08; C25D 11/26
[52] U.S. Cl. .................................. 205/322; 205/332
[58] Field of Search ............................ 205/322, 332

[56] References Cited

U.S. PATENT DOCUMENTS

| | | | |
|---|---|---|---|
| 2,874,102 | 2/1959 | Wainer | 204/42 |
| 3,321,677 | 5/1967 | Mandelcorn et al. | 317/230 |
| 3,331,993 | 7/1967 | Brown | 205/230 |
| 3,410,766 | 12/1968 | Schmidt et al. | 204/14 |
| 3,599,053 | 8/1971 | Nakata et al. | 317/230 |
| 3,849,124 | 11/1974 | Villani | 75/177 |
| 4,432,935 | 2/1984 | Kubo et al. | 419/2 |
| 4,468,719 | 8/1984 | Shimizu et al. | 361/433 |
| 4,539,146 | 9/1985 | Melody | 252/62.2 |
| 4,812,951 | 3/1989 | Melody et al. | 361/433 |

FOREIGN PATENT DOCUMENTS 2168383  6/1986  United Kingdom .

OTHER PUBLICATIONS

Holmes, Lewis, "The Changing World of Small Capacitors", Electronics & Power, Jun. 1981, pp. 452–454.
Igarashi, H. et al., "Development of a New Al-Ti Alloy Electrolytic Capacitor", IEEE, 1983, pp. 149–156.
Savoshenko et al., Kiev Polytechnical Institute (no date).

Primary Examiner—T. M. Tufariello
Attorney, Agent, or Firm—Buchanan Ingersoll

[57] ABSTRACT

A method is disclosed for producing an anodized film on titanium, its alloys and other metals such that the film deposited will have a specific leak rate of less than one nanoamp per square centimeter at room temperature with an impressed electric field of at least five volts, where the anodization is performed in a solution consisting of liquid ortho-phosphoric acid of reduced water content in an aprotic solvent, and articles of manufacture therefrom.

30 Claims, No Drawings

PROCESS FOR PRODUCING ELECTRICALLY IMPERVIOUS ANODIZED FILMS ON VALVE METALS AND PRODUCT THEREOF

BACKGROUND OF INVENTION

Titanium is one of the family of metals that can be anodized such that the anodized dielectric films deposited will pass current readily only in one direction. Said family is commonly referred to as "valve metals." Unlike vacuum tubes and semiconductors, valve metals do not find common use for rectifying electricity. Rather, valve metals find common use in electrolytic capacitors, aluminum and tantalum being the most useful. Electrolytic capacitors are used to filter and smooth out ripple in electrical circuits.

Electrolytic capacitors achieve that ability by virtue of the dielectric properties of the anodized films that insulate the two electrodes. Dielectric films are described in part by their dielectric constant. The higher the dielectric constant the more electricity a capacitor can store and the more effective it will be at smoothing out ripple in an electrical circuit.

Dielectric strength is also important. Dielectric strength describes the field strength a dielectric film will withstand before breaking down with a catastrophic flow of current. Dielectric strength is usually given in volts per centimeter that the film will withstand without arcing over. In working capacitors, dielectric strength is very important because higher dielectric strength permits higher working voltage.

Film resistivity is a third feature of capacitor films that is important. Volume resistivity refers to the tendency for a given film to leak off its charge. The higher the volume resistivity, the better the capacitor. Electricity that leaks away is electricity that does not do the job required in an electronic or electrical device. Electricity that leaks away commonly shows up as heat, an unwanted side effect in itself, especially in solid state devices.

The trend in modern electronic design it toward miniaturization. Electrolytic capacitors are needed that are more efficient on both volume and weight bases.

This invention involves improving the dielectric constant, dielectric strength and volume resistivity.

Table 1 illustrates current handbook values for several materials. Literature sources: Handbook of Chemistry and Physics, 66th Ed., CRC Press, 1985-1986; Handbook of Chemistry, Lange, 13th Ed., McGraw Hill, 1985.

TABLE 1

| DIELECTRIC PROPERTIES OF CAPACITOR MATERIALS AT 23° C. | | | |
|---|---|---|---|
| Material | Dielectric Constant $10^6$ Hertz | Dielectric Strength kv/cm | Volume Resistivity OHM-cm |
| Aluminum Oxide | 7.5-9 | 70-102 | 1010-1014 |
| Tantalum Pentoxide | 9-15 | 25-70 | 1012-1015 |
| Titanium Dioxide | 85* 165** | 40-85 | 1013-1016 |

*Perpendicular to c axis
**Parallel to c axis

Sources vary significantly with regard to dielectric values reported, by as much as an order of magnitude. But there is consensus that titanium dioxide has superior dielectric constants and volume resistivities. Neither of these quantities is unique. They are best described as tensors which means that the measured values vary with the direction of measurement relative to the crystal axes of the substances measured.

Table 1 shows that titanium appears to be a superior metal from which to manufacture electrolytic (or other types of) capacitors. There are several reasons why titanium has not been used commercially for capacitor manufacture. Chief among them is that even under the best anodizing conditions resorted to date, anodized titanium films exhibit residual leak rakes at least one or two orders of magnitude higher than shown by anodized films of aluminum or tantalum.

Nominal 85 weight percent ortho-phosphoric acid in aprotic solvent is a superior solution in which to anodize titanium, its alloys and other metals. Anodized films created by this method represent significant improvements over the earlier art. It remains however to produce films with high dielectric properties and at the same time minimize or eliminate significant leakage. This invention is directed towards that problem.

Water is a polar compound and that is the principal reason why water is such a good solvent for so many things. It readily donates hydronium (proton bound to a water molecule) and hydroxyl ions when inorganic acids or bases are added. This is why water is classed here as a protic solvent to the extent that water is present in the solutions of the poor art, excess hydronium and hydroxyl ions will be present.

Aprotic solvents essentially provide solutions that are poor proton donors. This is in marked contrast with protic solutions of the same anodizing acid. The aprotic nature of a solvent is qualitatively indicated by the lack of reaction between a 5 volume percent solution of nominal 85 percent orthophosphoric acid in the aprotic solvent selected and granulated ammonium carbonate. Solutions of phosphoric acid in protic solvents vigorously evolve carbon dioxide gas upon the addition of ammonium carbonate.

SUMMARY OF INVENTION

This invention performs anodization in an electrolytic cell employing any direct current source, such as a battery, or a D.C. power supply with amperage and voltage controlled independently. The cathode can be the cell electrolyte container itself or any suitable conductor, such as titanium, stainless steel or graphite, which is non-reactive with the anodizing solution. The metal being coated is the anode.

This invention employs aprotic solutions, a number of which are useful. The solvent used will usually be selected as a compromise among cost, toxicity and anodizing effectiveness considerations. Table 2 lists specific aprotic solvents found useful for anodizing purposes.

TABLE 2

| SUITABLE APROTIC SOLVENTS | |
|---|---|
| Propylene Carbonate | 5-95% by volume |
| Ethylene Carbonate | 5-95% by volume |
| Butyrolactone | 5-95% by volume |
| Sulfolane | 5-95% by volume |
| Dimethyl Sulfoxide, DMSO | 5-95% by volume |
| N-2 Ethyl Pyrrolidone | 5-95% by volume |
| N-2 Methyl Pyrrolidone | 5-95% by volume |

Table 3 lists modifiers that have been found useful. Propylene glycol may be substituted in part for an aprotic solvent. Urea is useful for lowering the resistance of the anodizing solution.

TABLE 3

USEFUL MODIFIERS

| | |
|---|---|
| Propylene Glycol | 5-50% by volume |
| Urea | 1-25% by volume |
| 4-Picoline | As sufficient |
| Silver Nitrate | As sufficient |
| Calcium Nitrate | As sufficient |
| Hydrotalcite | As sufficient |
| Calcium Phosphate | As sufficient |

The solvents and modifiers listed above are substantially water free. The preferred anodizing solutions will contain from 85 to 95 volume percent of one or more aprotic solvents selected according to the ranges given in Table 2, with or without a modifier selected from Table 3 together with five to fifteen volume percent of boiled ortho-phosphoric acid of this invention, as described below. It is understood that anodizing solutions containing five volume percent of nominal 85 percent orthophosphoric acid that do not react with granulated ammonium carbonate are covered by this invention, whether or not they are specifically listed in Tables 3 and 4.

The presence of halide in the anodizing solution or in the valve metal is undesirable since chloride ions tend to create tunnels and pits through the anodized film. Silver nitrate is a useful addition for reducing the chloride impurity content of the solution. Calcium phosphate serves the same purpose as a fluoride scavenger. Electron beam melting of the titanium under high vacuum is useful for reducing the chloride and fluoride inclusion level in the base metal to be anodized.

Anodizing solutions of this invention are essentially combinations of aprotic solvents with preboiled nominal 85 weight percent ortho-phosphoric acid. The preboiling reduces the water content of the nominal acid. Nominal 85 percent ortho-phosphoric acid contains 43.6 weight percent of water including water of combination, water of hydration and excess water. Water of combination, water of hydration and excess water comprise the total water content of the ortho-phosphoric acid. To illustrate water of combination see Formula 3 of Table 4 which shows 3 moles of water combined with one mole of phosphorous pentoxide. To illustrate water of hydration see formula 4 of Table 4 which shows 3 moles of water of combination plus one mole of water of hydration.

The phosphoric acid on which the examples are based was preboiled phosphoric acid. The preboiling lowered the total water content of the acid used in Examples 2-5 to about 38 weight percent. In general, the ortho-phosphoric acid of this invention can have a water of combination, water of hydration plus excess water content (total water content) of 34 to 43 weight percent generally, and 36 to 40 weight percent, preferably. The solvent itself is otherwise generally free of water.

Table 4 shows the build-up of water fractions in phosphoric acids from one mole of phosphorous pentoxide.

TABLE 4

BUILD UP OF WATER FRACTIONS IN PHOSPHORIC ACIDS FROM ONE MOLE OF PHOSPHORUS PENTOXIDE

| Compound | Formula wt | $H_2O:P_2O_5$ | Wt % $H_2O$ | mp - °C. |
|---|---|---|---|---|
| 1. $2HPO_3$ meta | 159.97 | 1 | 12.7 | sublimes |
| 2. $H_4P_2O_7$ pyro | 177.99 | 2 | 20.2 | 61 |
| 3. $2H_3PO_4$ ortho | 196.01 | 3 | 27.6 | 42.35 |
| 4. $2H_3PO_4.H_2O$ ortho | 214.02 | 4 | 33.7 | 29.32 |
| *86.2% $2H_3PO_4.H_2O$ | 248.28 | 5.9 | 42.8 | <20 |
| Nominal 85 weight % | 251.79 | 6.1 | 43.6 | <20 |
| $^xP_2O_5$ | 141.96 | | | |
| $^xH_2O$ | 18.02 | | | |

*Nominal 85 weight %, 86.2 weight % is actual assay, sp. gr. = 1.68.
$^x$Basis of calculations Because aprotic solvents differ somewhat in their dielectric properties, their effectiveness as anodizing solvents will differ in the efficiency with which they anodize and in the breakdown voltages that can be attained during anodizing. Aproptic solvents differ in costs, toxicity and numerous other properties. For these reasons, the solution most suitable for one purpose may not be most suitable for another.

We have found that low or near zero leakage current is obtained by employing the reduced water content nominal 85 percent ortho-phosphoric acid of this invention. The reduced water content acid of this invention is hygroscopic and will readily pick up moisture from the air. Once produced therefore, it must be protected from contact with air as much as possible.

The anodizing method using the preboiled 34 to 43 weight percent ortho-phosphoric acid can produce a film wherein the specific leak rate is less than one nanoamp per square centimeter at room temperature with an impressed voltage of at least five volts.

DESCRIPTION OF PREFERRED EMBODIMENTS

Example 1 illustrates the basic protocol used in anodizing tests of this invention using the reduced water content 85 percent ortho-phosphoric acid.

EXAMPLE 1

1 Heat ortho-phosphoric acid to 300° C. until the boiling stops.

2 Add the acid produced in step 1 to propylene carbonate to make the solution:
  a. 90 parts propylene carbonate
  b. 10 parts 34 to 43 weight percent water pyrophosphoric acid, including water of combination, water of hydration and excess water.

3 Mix thoroughly.

4 Cap the container tightly to exclude atmospheric moisture and allow to cool.

5 Transfer the solution to the anodizing container, minimizing contact with air, and cap, cover or otherwise protect the anodizing container from moisture ingress.

6 Set the DC power supply limiting current to about one milliamp per square centimeter of surface area of the material to be anodized.

7 Set the power supply voltage to the maximum desired.

8 Etch the material to be anodized to remove all surface contamination. A suitable etchant for titanium is:
  a. 60 parts deionized water b. 35 parts 70% nitric acid c. 1-5 parts 48% hydrofluoric acid—as sufficient to induce pickling action 9 Rinse the etched material immediately in purified and deionized water. Then rinse with ultra pure acetone and dry while maintaining cleanliness.

10 Transfer the material to be anodized into the anodizing apparatus and complete the electrical connection, taking care not to contaminate the material with halide ions, and the anodizing solution with water or with moisture from humid air. It may be preferable to anodize in a dehumidified area or dry room.

11 Stirring, if desired, is turned on at this time.

12 Turn on the power and follow the cell electrification, voltage and current, with time. After start-up, anodization is performed at a constant current with increasing voltage until the preset voltage is reached and thereafter at constant voltage with decreasing current.

13 When anodizing is complete, step down the voltage in increments to establish the voltage at which no detectable current flows. This step does nothing for the film but rather verifies its quality. Quality here means very low or zero leakage of current.

Other protocols vary anodizing time, materials, electrification and solutions used but follow the same basic format.

Any of the solutions in Tables 2 and 3 may be used. The most useful initial anodizing current may be between about 0.1 and about 10 milliamperes per square centimeter. It is understood that currents outside this ring may be used. The peak voltage may be up to 600 volts.

The completion of anodization may be judged in various ways. Experience will determine which material, solution and electrification parameters is best. For titanium, excellent results were obtained in 15 to 30 minutes of anodizing time.

Examples 2 through 8 were performed on the same lot of high purity titanium foil and the same apparatus. Examples 2 through 5 illustrate results using acids of reduced water content of this invention in tests where only the anodizing times were varied.

EXAMPLE 2

| EXAMPLE 2 | |
|---|---|
| Applied Voltage | 100 |
| Anodize time | 1180 seconds |
| Zero current voltage | 34 |
| EXAMPLE 3 | |
| Applied Voltage | 100 |
| Anodize time | 1680 seconds |
| Zero current voltage | 37 |
| EXAMPLE 4 | |
| Applied Voltage | 100 |
| Anodize time | 1300 seconds |
| Zero current voltage | 37 |
| EXAMPLE 5 | |
| Applied Voltage | 100 |
| Anodize time | 900 seconds |
| Zero current voltage | 34 |

In these examples, one nanoamp per square centimeter of current was easily detectable. It may be observed that anodizing time is not critical in these examples. In each of these examples the zero current voltage was measured, in situ, that is at the end of the anodizing period, in the same solution and apparatus used to anodize the material.

Note that in Examples 2-5 that the zero current voltage is multiples above the five volt threshold common to solid state devices.

Higher anodizing voltages produce higher zero current voltages. Higher anodizing voltages, up to 600 volts, may be used. In those cases, the pyrrolidones, alone or in mixtures together are preferred over propylene carbonate as the aprotic solvent.

Examples 2-5, using the ortho-phosphoric acid of this invention, are in contrast with examples 6-8 where non-pre-boiled nominal 85 weight percent ortho-phosphoric acid having 43.6 weight percent of water was used, including water of combination, water of hydration and excess water. The ortho-phosphoric acid used in Examples 2-5 contained about 38 weight percent of water, including water of combination, water of hydration and excess water was prepared by boiling 855 ortho-phosphoric acid. The only other difference was that anodizing times were different and 75 volts was used in one case.

| EXAMPLE 6 | |
|---|---|
| Applied Voltage | 100 |
| Anodize time | 17770 seconds |
| Final Kohms/Coulomb/sec* | 0 |
| Final leak, micro amp/cm2 | 7.34 |
| Zero current voltage | Zero |
| EXAMPLE 7 | |
| Applied Voltage | 100 |
| Anodize time | 23400 seconds |
| Final Kohms/Coulomb/sec* | 9.7 |
| Final leak, micro amp/cm2 | 0.77 |
| Zero current voltage | Zero |
| EXAMPLE 8 | |
| Applied Voltage | 75 |
| Anodize time | 99950 seconds |
| Final Kohms/Coulomb/sec* | 8.8 |
| Final leak, micro amp/cm2 | 0.39 |
| Zero current voltage | Zero |

*Termination parameter

Note in particular that there is no zero current voltage. The films of Examples 6-8, while less well suited for capacitor applications than the present invention, are nevertheless excellent as protective coatings for surgical implants or prosthetic devices, as are the films produced in Examples 2-5. Where the final leakage rate is important, the reduced water content ortho-phosphoric acid of this invention provides unexpectedly superior results.

Films produced by this invention will contain some amount of phosphorus by Auger analyses. As deposited, films deposited by means of this invention may be amorphous or noncrystalline in nature. After anodizing, annealing an amorphous film may or may not cause the film to crystallize.

Films deposited by means of this invention will also have a high dielectric constant as measured in 10% nitric acid in aqueous solution. The sample anodized in example 3 produced the results shown in Example 9 when used as an anode in an electrolytic capacitor including a counter electrode, a casing and connector wires.

| EXAMPLE 9 | |
|---|---|
| Applied Voltage | 100 |
| Anodize time | 1680 seconds |

EXAMPLE 9 (continued)

| | |
|---|---|
| Specimen area, A | 25.76 cm$^2$ |
| Film thickness, t | 226 nm |
| Measured Capacitance, C | 2.2 micro farads |
| Dissipation factor | 0.014 |
| Dielectric constant, $\epsilon$, 120 Hz | 19.3* |

*Calculated from $\epsilon = Ct/\epsilon_o A$ where $\epsilon_o$ is the dielectric constant of air.

The apparatus constructed and operated to provide the results in Example 9 stored electricity. This apparatus operated as a capacitor and therefore shows the use of the present invention.

A dielectric constant of 19 is superior to those given in Table 1 for the oxides of tantalum or aluminum. The film thickness was calculated from the known amount of electricity passing during anodization. This procedure is valid because anodizing according to this invention proceeds in a very efficient manner with essentially no gassing.

Other materials may be anodized by the means disclosed here. Aluminum, tantalum, niobium and zirconium can be anodized in essentially this same way. The advantages of using aprotic solvents when anodizing other materials vary but include the potential for higher anodizing voltage and lower leakage.

Articles of manufacture produced by this invention include, but are not limited to, electrodes in electrolytic capacitors where the form of those electrodes may be a wafer substrate, a wrought product, a thin deposited film, thin sheet, foil or powder consolidated into a porous mass by suitable cold compaction and sintering.

A suitable electrolyte in an electrolytic capacitor may be any suitable solution having low resistivity that does not corrode, degrade or otherwise react with the anodic film to a significant degree. The electrolyte in said capacitor serves as the counter electrode. Solutions that contain an oxidizing anion have the added advantage for titanium because the anodized electrode tends to be self healing in the presence of defects. This feature is illustrated by an experiment measuring leakage current in a perforated film where dilute nitric acid in water served as the counter electrode electrolyte. The leakage current decreased significantly with time. Oxidizing solutions have a passivating effect on titanium. Suitable electrolytes include aprotic anodizing solutions modified to have very low resistivities; mineral acids that are oxidizing in contrast to reducing acids ($HNO_3$ is oxidizing where $H_2SO_4$ is reducing); and mixtures thereof.

A suitable counter electrode also may be any solid material capable of conducting electricity. Suitable solids include manganese dioxide, $MnO_2$, and chemical or vapor deposited metallic films. Vapor deposition may be done by sputtering. Useful metallic counter electrodes include but are not limited to chromium, cobalt, silicon, aluminum, niobium, tantalum, molybdenum, zirconium, hafnium, gold and tungsten and their alloys. Gallium arsenide also may be used as a counter electrode. High temperature superconductors are suitable counter electrodes as are conductive polymers.

High purity titanium is not a strong material. If higher strength is needed, suitable strengthening alloy additions to titanium include one or more of oxygen, aluminum, tin, vanadium, zirconium, niobium, tantalum, molybdenum and iron.

It is to be understood that the practice of this invention is not limited by the examples illustrated.

Any suitable aprotic solvent, for example, may be used.

Any of the family of valve metals may be anodized effectively by this invention.

Alloys of valve metals may be anodized by this invention.

Articles produced by this invention will exhibit leak rates less than about one nanoamp per square centimeter under an applied voltage related to, but a fraction of, the anodizing voltage.

Examples of suitable anodizing times are 900 to 1800 seconds, but we are not limited to these times. Substantially longer times are useful. For a given anodizing solution, temperature and stirring condition, the optimum anodizing time is governed by the initial anodizing current setting and the maximum voltage. The anodizing process can begin at a current of 0.1 to 10 milliamperes per square centimeter of surface to be anodized. Examples of working voltage for zero current leakage are at least 5 volts or at least 30 volts.

Anodization is preferably begun at a constant current with increasing voltage. Alternately, the current can vary during the anodization. Also, the voltage can stay constant as the film thickness increases during anodization and the current will tend to decrease with constant voltage.

Following are some parameters that can be used to control the end of the anodization.

1. Pre-determined level of specific current flow in amperes.
2. Pre-determined specific quantity of electricity passing through the system in coulombs per unit area of film.
3. Pre-determined level of film resistivity in ohms.
4. Pre-determined electrical parameter such as:
   A. Zero current voltage
   B. Zero current voltage as fraction of maximum applied voltage.
   C. Product of real time specific anodizing current and total coulombs; eg. mA=total coulombs.
   D. Current decay partial derivative $\delta I/\delta t v T s$ where I is amperes, t is time, T is temperature, v is volts and s represents all other variables such as solution composition.
   E. Resistivity measure such as $\delta I/\delta t/tTs$.
   F. Other real time parameter analogous to 4-4E above.
5. Pre-determined physical characteristic of film such as:
   A. Color of reflected light.
   B. Refractive index relative to a vacuum.
   C. Capacitance in farads and/or dissipation factor (may be measured in situ).
6. Maximum voltage for zero time or some predetermined time.
7. Predetermined combination of capacitance and dissipation factor in situ.
8. Any combination of the above.

We claim:

1. A process for anodizing a valve metal from the group consisting of titanium, aluminum, tantalum, niobium, zirconium, and titanium or their alloys, where the anodizing solution comprises an aprotic solvent and liquid ortho-phosphoric acid having a total water content including combined water, water of hydration and excess water content of 34 to 43 weight percent.

2. The process of claim 1 wherein said total water content is 36 to 40 weight percent.

3. The process of claim 1 wherein said total water content is about 38 weight percent.

4. The process of claim 1 wherein said total water content is between 36 and 40 weight percent and anodizing proceeds until desired anodic film characteristics have been developed.

5. The process of claim 1 wherein anodizing begins under constant current with increasing voltage.

6. The process of claim 1 wherein the valve metal is titanium.

7. The process of claim 1 wherein the valve metal is a titanium alloy.

8. The process of claim 7 wherein the titanium alloy addition is from the group consisting of 0, Al, Sn, V, Mo, Nb, Ta, Zr, Fe.

9. The process of claim 1 wherein the aprotic solvent is selected from the group consisting of propylene carbonate, ethylene carbonate, butyrolacetone, sulfolane, dimethyl sulfoxide, N-2 ethyl pyrrolidone and N-2 methyl pyrrolidone.

10. The process system of claim 9 including a modifier selected from the group consisting of propylene glycol, urea, 4 picoline, silver nitrate, calcium nitrate, hydrotalcite and calcium phosphate.

11. The process of claim 1 wherein said liquid ortho phosphoric acid having a total water content of 34 to 43 weight percent is prepared by boiling nominal 85 weight percent orthophosphoric acid having 42.8 weight percent of combined and excess water.

12. The process of claim 1 wherein the anodizing voltage is up to 600 volts.

13. The process of claim 1 wherein the anodizing current is initially about one milliamp per square centimeter of the article anodized.

14. The process of claim 1 wherein solution preparation and anodizing operations are conducted in a dry room.

15. The process of claim 1 wherein the anodizing process proceeds out of contact with moist air.

16. The process of claim 1 wherein anodizing times range from about 900 to about 1800 seconds.

17. The process of claim 1 wherein anodization begins at a current of about 0.1 to 10 milliampere per square centimeter of surface to be anodized.

18. The process of claim 1 wherein the article manufactured is at least one electrode in an electrolytic capacitor.

19. The process of claim 1 wherein the working voltage for zero leakage current is at least five volts.

20. The process of claim 1 wherein the working voltage for zero leakage current is at least thirty volts.

21. The process of claim 1 wherein the form of material anodized is a wafer, wrought product, thin sheet, foil, vapor deposited film or a compacted powder.

22. The process of claim 1 wherein the article manufactured is a prosthetic device.

23. The anodized metal or alloy manufactured according to the process of claim 1.

24. The anodized metal or alloy manufactured according to the process of claim 6.

25. The anodized alloy manufactured according to the process of claim 7.

26. An electrolytic capacitor incorporating the anodized metal or alloy of claim 23.

27. An electrolytic capacitor incorporating the anodized metal or alloy of claim 24.

28. An electrolytic capacitor incorporating the anodized alloy of claim 25.

29. The process of claim 1 wherein said aprotic solvent comprises 85 to 95 percent by volume of said solution, the remainder of said solution being said orthophosphoric acid.

30. The process of claim 10 wherein said solution comprises 85 to 95 volume percent of said solvent and said modifier and 5 to 15 volume percent of said orthophosphoric acid.

* * * * *

UNITED STATES PATENT AND TRADEMARK OFFICE
CERTIFICATE OF CORRECTION

PATENT NO. : 5,211,832
DATED : May 18, 1993
INVENTOR(S) : MATHEW COOPER, HARRY ROSENBERG

It is certified that error appears in the above-indentified patent and that said Letters Patent is hereby corrected as shown below:

Column 1, Table 1:

"1010-1014" should read --$10^{10}$-$10^{14}$--

"1012-1015" should read --$10^{12}$-$10^{15}$--

"1013-1016" should read --$10^{13}$-$10^{16}$--

Column 6, line 19, "855" should read --85%--

Signed and Sealed this

Twenty-seventh Day of August, 1996

Attest:

BRUCE LEHMAN

Attesting Officer     Commissioner of Patents and Trademarks